Feb. 21, 1950     J. R. ALFONSO     2,498,476
MOTION-ART MECHANICAL TOY
Filed May 29, 1946
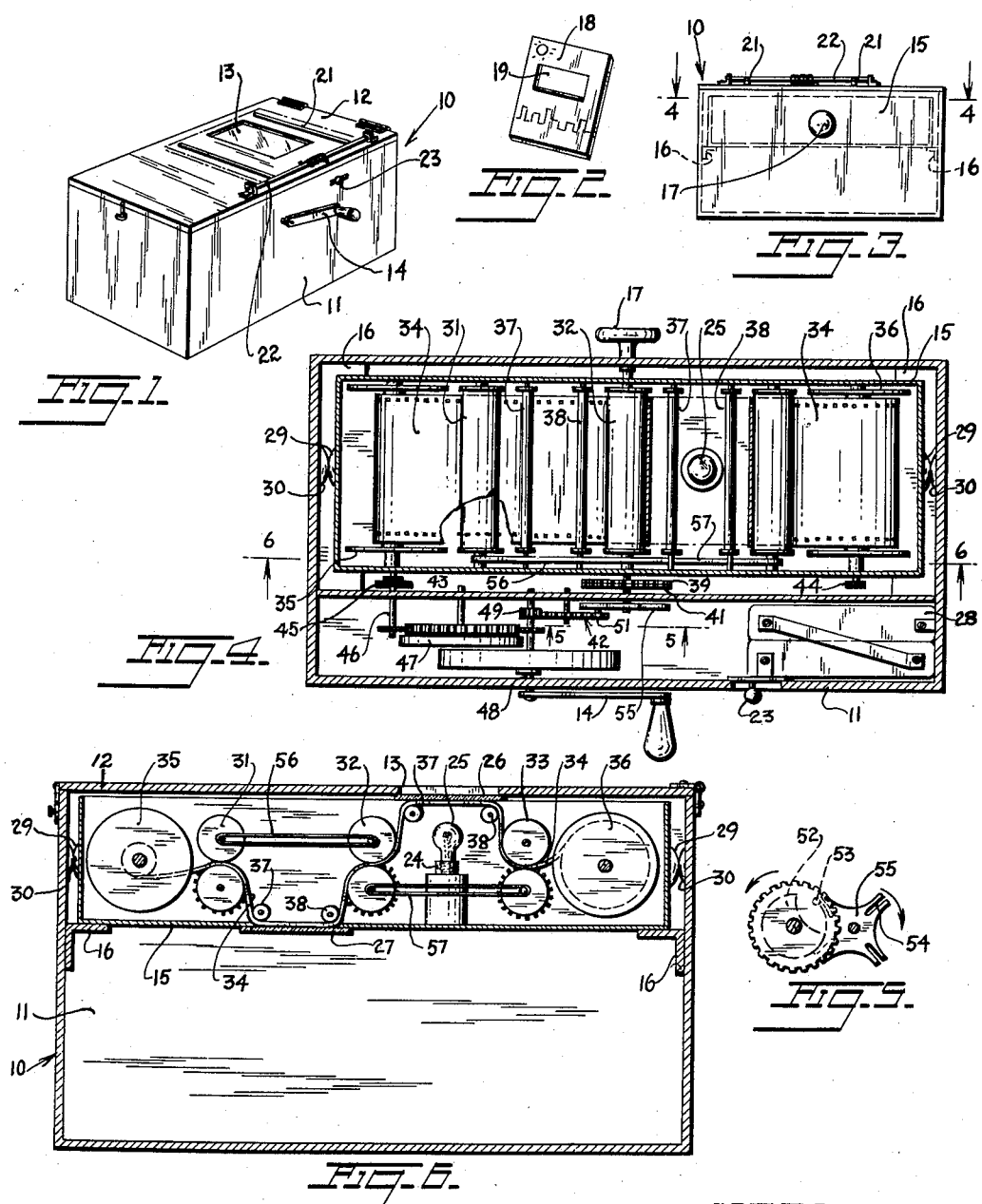
INVENTOR
JOSEPH R. ALFONSO
BY
*Zoltan Holacsek*
ATTORNEY Patented Feb. 21, 1950

2,498,476

UNITED STATES PATENT OFFICE 2,498,476

MOTION-ART MECHANICAL TOY

Joseph R. Alfonso, New York, N. Y.

Application May 29, 1946, Serial No. 673,100

5 Claims. (Cl. 40—86)

This invention relates to a mechanical toy kit and more particularly a toy through which pictures on a film can be exposed to the vision of the operator in a step by step manner as a crank is turned to move the film past an opening.

It is one object of the invention to provide a toy by which films can be passed by a window in intermittent fashion in which provision is made for the removal of the film containing device from the main supporting casing whereby a new film can be placed in the device.

It is another object of the invention to provide a toy for portraying a film on which pictures are displayed on both sides of the film and whereby upon removal of the mechanism containing the film and reversing it without removing the film, before returning it to the supporting casing, the pictures on the opposite side of the film will be viewed.

It is another object of the invention to provide in the main support for the film containing device, a principal part of the power supplying gearing in fixed fashion with which the film containing device will engage upon being located in the support thereby keeping the mechanism on the film containing device to a minimum.

It is still another object of the invention to provide a picture displaying toy having a lighting means used with films of the transparent type with only the one set of pictures thereon which may be automatically controlled by the insertion of film device with the main support.

According to the invention, a main support or box is provided with a window in the top thereof through which the films are to be observed. A film containing device is adapted to be inserted through one side of the main supporting box in much the same manner that a drawer would fit a chest. This film supporting device is a self contained structure bearing the film spools at opposite ends thereof between which the film is stretched and sets of rollers having teeth cooperating with the film to cause the passage of the same through the device and aligned with windows in the device itself located respectively at the top and bottom of the device. This film containing device when opaque film is used with pictures on opposite sides thereof can be removed from the main support and simply reinserted in a reverse manner to view the opposite side of the film. Within the main support there is permanently carried a Geneva gear mechanism for obtaining intermittent motion when a friction plate on the film device engages a friction plate forming part of the Geneva mechanism. A crank extends through the opposite side of the box from which the film containing device is withdrawn by which the turning movement of the Geneva mechanism is supplied by hand. A transmission drive is extended from the Geneva mechanism for connection with the film spool onto which the observed pictures are rolled. Also on the main support is located a set of batteries and contacts which are automatically engaged by contacts on the film device as it is fitted into the main support. If films of the transparent type are being used, a switch on the main support is kept closed to extend the current into the film device containing the lamps.

Fig. 1 is a perspective view of the main support with the film containing device disposed therein with the arrangement set up for operation, the mechanism being shown on the top of the device for retaining a theme sheet on the top of the support having a window in registry with the main window in the top of the supporting casing.

Fig. 2 is a perspective view of the theme sheet detached from the main support.

Fig. 3 is a side elevational view of the main support looking upon the side of the film device, the view being taken along line 3—3 of Fig. 1, looking in the direction of the arrows thereof.

Fig. 4 is a cross sectional view, in horizontal section with the top of the main support removed looking down upon the separable film device. The Geneva gear operating mechanism, the drive between this Geneva mechanism and one of the film spools and upon the batteries, are all viewed along the line 4—4 of Fig. 3.

Fig. 5 is an elevational view looking upon the principal parts of the Geneva gear mechanism, taken along the line 5—5 of Fig. 4, looking in the direction of the arrows thereof.

Fig. 6 is a cross sectional view in elevation of the assembled toy kit, viewed along the line 6—6 of Fig. 4, looking in the direction of the arrows thereof.

Referring now particularly to the Figs. 1, 2 and 3, 10 represents the completely assembled kit which comprises generally a main support 11 having a top 12 with a picture viewing opening 13 therein and a hand crank 14 for passing the pictures along the opening 13.

At the side of the kit opposite to the crank 14, a film containing device 15 adapted to be supported on angle brackets 16 on the main support casing 11, in a manner so that it can be withdrawn from the casing 11, to insert a new film or to reverse the film device so that pictures on the opposite side of an opaque film can be observed. A handle 17 serves to effect the withdrawal movement of the film device.

In order to make the toy kit bear indicia of which the pictures relate, a theme sheet 18 with paintings thereon and having an opening 19 therein is laid on the top 12 of the main support 11 so that its opening 19 is in registry with the opening 13. In order to retain the theme sheet 18 in place there is provided spring fingers 21 slidable along a rod 22 mounted on the top of the main support so as to properly position the fingers on the sheet. A slide switch element 23 on the same side of the main support 11 as the handle 14 serves to cut in and out the battery source depending upon whether or not transparent films with only one picture thereon at a given location are being displayed.

Referring now particularly to Figs. 4, 5 and 6 there is shown in detail the film containing device, and the mechanism associated with the main support by which intermittent driving motion is given to the film device.

The film device indicated generally at 15 comprises a frame of light metal or plastic adapted to support drive rollers and film spools.

A lamp socket 24 and lamp 25 (as viewed in Fig. 6) are located in the rear of at least one of the windows 26 and 27 in the top and bottom of the frame. This lamp 25 is used when a film of transparent material with but one set of pictures thereon is being displayed. Connection with batteries 28 is automatically made through cooperating contact buttons 29 and 30 at opposite sides of the main support 11 connected by dotted lines with the lamp 25 and the batteries 28. The switch 23 will turn off the battery source when opaque films having pictures on each side are being used. If the double film is being used, the film device 15 is withdrawn and then inserted again in the main support so that the window 27 is aligned with the opening 13 instead of the window 26. At that time the pictures on the reverse side of the film can be observed.

The film device 15 contains three sets of propelling rollers 31, 32 and 33 carried by sub frames and between which film 34 is drawn from one of film spools 35 or 36 and driven over rollers 37 and 38 adjacent the windows 26 and 27 to expose the different pictures of the film 34. Star pins are provided with each set of rollers for cooperation with series of perforations at opposite sides of the film and by which a positive drive of the film is effected. The frame structure carries a friction plate 39 which connects with a friction plate 41 of Geneva gear mechanism 42 of the main frame support. Likewise bevel pinions 43 and 44 for driving the respective spools 35 and 36 are located at opposite ends of the film device. There is one bevel gear 45 at the left of the main frame support with which either gear 43 or 44 will connect depending upon how the film device is inserted in the main support. This bevel gear 45 is carried on a shaft 46 driven by a coil spring pulley belt 47 to permit slippage when necessary and connected to a crank shaft 48 operated by the crank 14.

The crank shaft 48 has a pinion 49 meshing with gear 51 containing Geneva gear locking member 52 and pin 53. The pin 53 cooperates with slots 54 in the Geneva gear part 55 to turn the friction plate 41 intermittently.

By engagement of the plate 41 with the plate 39 of the film device central roller unit 32 is driven directly. Extending from this central unit are bands or chains 56 and 57 which will drive the respective outer units 31 and 33.

While I have illustrated and described the preferred embodiments of my invention, it is to be understood that I do not limit myself to the precise constructions herein disclosed and the right is reserved to all changes and modifications coming within the scope of the invention as defined in the appended claims.

Having thus described my invention, what I claim as new, and desire to secure by United States Patent is:

1. A mechanical toy kit for displaying a set of pictures in consecutive order comprising a main supporting casing having a top wall, a vertical partition separating said casing into a large and a small compartment, brackets in said large compartment between said top and bottom thereof, said top wall having a viewing window in said large compartment, a film container in said large compartment supported on said brackets having a bottom wall and an open top, a film spool rotatably mounted at each of the opposite ends of said container, said container being spaced from said partition and the shafts of said spools passing into said space, a gear on each of said shafts, said shafts being on the horizontal center of said container, film guiding rollers arranged in offset pairs, one pair being directly beneath and adjacent said window when said container is disposed with said open top arranged upwardly, and the other pair being directly beneath and adjacent said window when said container is inverted with said open top arranged downwardly, said container bottom wall containing a viewing window between said other pair of rollers, and a film driving mechanism mounted in said small compartment including a crank at the outer side of the adjacent casing side wall, a gear in said space for meshing with either of said spool gears depending upon the position of said container on said brackets, and a gear train connecting said gear in said space with said crank whereby said film may be viewed from one side when said container open top is upwardly and may be viewed from the other side when said container open top is downwardly, through said casing window.

2. A mechanical toy kit for displaying a set of pictures in consecutive order comprising a main supporting casing having a top wall, a vertical partition separating said casing into a large and a small compartment, brackets in said large compartment between said top and bottom thereof, said top wall having a viewing window in said large compartment, a film container in said large compartment supported on said brackets having a bottom wall and an open top, a film spool rotatably mounted at each of the opposite ends of said container, said container being spaced from said partition and the shafts of said spools passing into said space, a gear on each of said shafts, said shafts being on the horizontal center of said container, film guiding rollers arranged in offset pairs, one pair being directly beneath and adjacent said window when said container is disposed with said open top arranged upwardly, and the other pair being directly beneath and adjacent said window when said container is inverted with said open top arranged downwardly, said container bottom wall containing a viewing window between said other pair of rollers, and a film driving mechanism mounted in said small compartment including a crank at the outer side of the adjacent casing side wall, a gear in said space for meshing with either of said spool gears depending upon the position of said container on said brackets, and a gear train connecting said gear in said space with said crank whereby said film may be viewed from one side when said container open top is upwardly and may be viewed from the other side when said container open top is downwardly, through said casing window, and a light between said first mentioned guiding rollers for lighting said film for viewing when said container is disposed with its open top upwardly.

3. A mechanical toy kit for displaying a set of pictures in consecutive order comprising a main supporting casing of rectangular configuration having a top wall, side walls, end walls and a bottom wall, a vertical partition separating said casing into a large and a small compartment, brackets in said large compartment between said top and bottom walls, said top wall having a viewing window in said large compartment, a film containing box in said large compartment supported on said brackets having a bottom wall and an open top, a film spool rotatably mounted at each of the opposite ends of said box, said box being spaced from said partition and the shafts of said spools passing into said space, a gear on each of said shafts, said shafts being on the horizontal center of said box, film guiding rollers arranged in offset pairs, one pair being directly beneath and adjacent said window when said box is disposed with said open top arranged upwardly, and the other pair being directly beneath and adjacent said window when said box is inverted with said open top arranged downwardly, said box bottom wall containing a viewing window between said other pair of rollers, and a film driving mechanism mounted in said small compartment including a crank at the outer side of the adjacent casing side wall, a gear in said space for meshing with either of said spool gears depending upon the position of said box on said brackets, and a gear train connecting said gear in said space with said crank whereby said film may be viewed from one side when said box open top is upwardly and may be viewed from the other side when said box open top is downwardly, through said casing window.

4. A mechanical toy kit for displaying a set of pictures in consecutive order comprising a main supporting casing of rectangular configuration having a top wall, side walls, end walls, and a bottom wall, a vertical partition separating said casing into a large and a small compartment, brackets in said large compartment between said top and bottom walls, said top wall having a viewing window in said large compartment, a film containing box in said large compartment supported on said brackets having a bottom wall and an open top, a film spool rotatably mounted at each of the opposite ends of said box, said box being spaced from said partition and the shafts of said spools passing into said space, a gear on each of said shafts, said shafts being on the horizontal center of said box, film guiding rollers arranged in offset pairs, one pair being directly beneath and adjacent said window when said box is disposed with said open top arranged upwardly, and the other pair being directly beneath and adjacent said window when said box is inverted with said open top arranged downwardly, said box bottom wall containing a viewing window between said other pair of rollers, film moving mechanism including a toothed wheel and an untoothed wheel between which said film passes, disposed between said pairs of guiding rollers, and similar sets of toothed and untoothed wheels at the opposite sides of said guiding rollers and connected to said first mentioned wheels by pulleys and means for turning said first mentioned wheels, and a film driving mechanism mounted in said small compartment including a crank at the outer side of the adjacent casing side wall, a gear in said space for meshing with either of said spool gears depending upon the position of said box on said brackets, and a gear train connecting said gear in said space and said first mentioned wheels with said crank whereby said film may be viewed from one side when said box open top is upwardly and may be viewed from the other side when said box open top is downwardly, through said casing window.

5. A mechanical toy kit for displaying a set of pictures in consecutive order comprising a main supporting casing or rectangular configuration having a top wall, side walls, end walls, and a bottom wall, a vertical partition separating said casing into a large and a small compartment, brackets in said large compartment between said top and bottom walls, said top wall having a viewing window in said large compartment, a film containing box in said large compartment supported on said brackets having a bottom wall and an open top, a film spool rotatably mounted at each of the opposite ends of said box, said box being spaced from said partition and the shafts of said spools passing into said space, a gear on each of said shafts, said shafts being on the horizontal center of said box, film guiding rollers arranged in offset pairs, one pair being directly beneath and adjacent said window when said box is disposed with said open top arranged upwardly, and the other pair being directly beneath and adjacent said window when said box is inverted with said open top arranged downwardly, said box bottom wall containing a viewing window between said other pair of rollers, and a film driving mechanism mounted in said small compartment including a crank at the outer side of the adjacent casing side wall, a gear in said space for meshing with either of said spool gears depending upon the position of said box on said brackets, and a gear train including an intermittent driving wheel, said train connecting said gear in said space with said crank whereby said film may be moved by definite increments and viewed from one side when said box open top is upwardly and may be viewed from the other side when said box open top is downwardly, through said casing window.

JOSEPH R. ALFONSO.

REFERENCES CITED

The following references are of record in the file of this patent:

UNITED STATES PATENTS

| Number | Name | Date |
|---|---|---|
| 872,840 | Nelson | Dec. 3, 1907 |
| 1,024,044 | Tucker | Apr. 23, 1912 |
| 1,223,270 | Greer | Apr. 17, 1917 |
| 1,295,544 | McNeil | Feb. 25, 1919 |
| 1,496,515 | Beckett | June 3, 1924 |
| 1,618,049 | Blanchard | Feb. 15, 1927 |
| 1,777,110 | Summer | Sept. 30, 1930 |
| 1,809,378 | Eschenbach | June 9, 1931 |
| 1,844,542 | Cook | Feb. 9, 1932 |